United States Patent
Roberts (10) Patent No.: US 6,735,170 B1
(45) Date of Patent: May 11, 2004

(54) METHOD AND SYSTEM FOR ESTABLISHING CONTENT-FLEXIBLE CONNECTIONS IN A COMMUNICATIONS NETWORK

(75) Inventor: Kim B. Roberts, Nepean (CA)

(73) Assignee: Nortel Networks Limited, St-Laurent (CA)

( * ) Notice: Subject to any disclaimer, the term of this patent is extended or adjusted under 35 U.S.C. 154(b) by 0 days.

(21) Appl. No.: 09/539,707

(22) Filed: Mar. 31, 2000

(51) Int. Cl.[7] .............................................. G08C 15/00
(52) U.S. Cl. ........................ 370/230; 370/351; 370/465
(58) Field of Search ................ 370/235–238, 370/535–543, 230, 351, 465

(56) References Cited

U.S. PATENT DOCUMENTS

| | | | | |
|---|---|---|---|---|
| 5,867,502 A | * | 2/1999 | Chang | 370/477 |
| 5,933,412 A | | 8/1999 | Choudhury et al. | 370/235 |
| 6,044,080 A | * | 3/2000 | Antonov | 370/401 |
| 6,088,371 A | * | 7/2000 | Inada et al. | 370/537 |
| 6,094,417 A | * | 7/2000 | Hansen et al. | 370/222 |
| 6,202,082 B1 | * | 3/2001 | Tomizawa et al. | 709/201 |
| 6,434,611 B1 | * | 8/2002 | Wilson et al. | 709/221 |
| 2002/0027885 A1 | * | 3/2002 | Ben-Ami | 370/254 |

* cited by examiner

Primary Examiner—Hassan Kizou
Assistant Examiner—Christopher M Swickhamer (57) ABSTRACT

A method for establishing connections along a network route, including determining a capacity and a set of concatenation constraints, and allocating selected resources along the route to allow the delivery of any combination of signals satisfying the set of concatenation constraints and having a total capacity not exceeding the determined capacity. Also disclosed is a method of establishing at least one higher layer connection (HLC) within a lower layer connection (LLC), including determining a first capacity and a first set of concatenation constraints associated with the LLC; establishing the LLC by allocating selected resources along the route to allow the delivery of any combination of signals satisfying the first set of concatenation constraints and having a total capacity not exceeding the first capacity; and, for each HLC, using a respective subset of the allocated resources to carry a respective combination of signals satisfying a respective set of second concatenation constraints which is a subset of the first set of concatenation constraints.

43 Claims, 8 Drawing Sheets

METHOD AND SYSTEM FOR ESTABLISHING CONTENT-FLEXIBLE CONNECTIONS IN A COMMUNICATIONS NETWORK

FIELD OF THE INVENTION

The present invention relates generally to communications networks and, more particularly, to methods and systems for establishing high-capacity connections in such networks.

BACKGROUND OF THE INVENTION

In a communications network, traffic generally travels from a source to a destination though one or more intermediate nodes, also known as cross-connection hubs, which may be spaced hundreds of kilometers apart. Different geographical regions of a large network are usually owned and run by entities known as network operators, network administrators or telcos and several such network operators may join forces to establish a communications network which spans an entire country or continent.

Usually, the network operators serve to provide capacity which is then loaned to smaller entities known as service providers. Each such service provider may be desirous of establishing a relatively permanent, high-capacity connection between two points in the large network. Each such high-capacity connection may be intended to provide communications services for multiple end users, also known as subscribers. Thus, the high-capacity connection associated with a service provider may be referred to as a composite connection.

Each composite connection generally has a capacity that is still considerably less than the switching capacity of a single network node. Thus, several composite connections associated with different service providers and having their own respective sources and destinations may nevertheless be processed by the same switching node if it so happens that these composite connections share the same portion of the route which passes through the switching node in question. Therefore, it is often the case that individual switching nodes end up processing traffic streams belonging to multiple composite connections that are associated with different service providers.

In today's networks, traffic commonly consists of digital frame-based signals which abide by a synchronous standard such as SONET (Synchronous Optical Network), which is described in Bellcore document GR-253-CORE, Issue 2, December 1995, Revision 2, January 1999, hereby incorporated by reference herein in its entirety. The elementary unit defined by the SONET standard is a synchronous transport signal having a line rate of 51.84 Mbps, commonly referred to as an STS level 1 (or STS-1) signal.

As is known in the art, each frame of an STS-1 signal has a relatively small number of bytes in a portion known as the "transport overhead" and a significantly larger number of bytes in a portion known as the "synchronous payload envelope" (SPE). The transport overhead contains the so-called section overhead and line overhead, and it performs the functions needed to transmit, monitor and manage the SPE over a fiber system. It also contains an STS-1 payload pointer, which indicates the start of the SPE. For its part, the SPE consists of a path overhead and a payload. The path overhead supports the monitoring and management of the payload, while the payload carries the voice or data signals being transported.

In many cases, it is desirable to transmit signals at a rate higher than the relatively low basic SONET line rate of 51.84 Mbps. The SONET standard provides for at least two ways of transmitting higher-bandwidth signals at line rates that are a multiple of (e.g., N times) the basic SONET line rate of 51.84 Mbps. Both techniques involve mapping a high-rate data stream into the SPE of a high-rate SONET signal. Specifically, both techniques require initially chopping up the high-rate data stream into N SPE segments per frame.

Using a first technique, the SPE segments are then multiplexed on a byte-by-byte basis and transported by an STS-N signal. The individual SPE segments travel independently across the network and may reach their destination with slight relative delays. Hence, it is beneficial to employ this first technique when it is desired to transmit N independent STS-1 signals in parallel.

Using a second technique, the SPE segments are not multiplexed but rather are transmitted in strict order by an STS-Nc signal (known as a "concatenated" signal). The fact that the signal is concatenated is indicated by a special arrangement of bytes in the transport overhead of the STS-Nc signal which identify one of the portions of the SPE as being the last such portion in the frame. The STS-Nc signal carries the individual SPE segments, in order, until they reach their destination. Hence, it is beneficial to employ this second technique when it is desired to transmit a high-rate data stream which cannot be broken down into smaller components.

The hardware needed to process an STS-N signal is different from the hardware required to process an STS-Nc signal. For example, it is noted that in order to process an STS-N signal at a switching node, it is feasible to de-multiplex the STS-N signal into its N STS-1 components and to process each component separately. This is an advantage in situations where N is high and where a single ASIC (application specific integrated circuit) is incapable of processing the entire STS-N signal. In such a case, an appropriate number of additional ASICs can be provided to help process the N de-multiplexed STS-1 signals in parallel.

In contrast, an STS-Nc signal may not be broken up (e.g., through de-multiplexing) because the sequence of bytes in the SPE is important. In order not to break up the signal at each step of the way along its route, the same application-specific integrated circuit (ASIC) must usually be employed to process the entire STS-Nc signal.

Since the two types of higher-capacity signals have their own specific advantages and useful applications, it is usually the case that a composite connection to be established by a service provider will consist of both STS-N signals (for different values of N) and STS-Mc signals (for different values of M). In order to allow a particular combination of STS-N signals and STS-Mc signals to be transmitted, it is necessary for the service provider to verify with each network operator that suitable hardware resources are available along each segment of the route.

There are two main limitations which can affect the establishment of a composite connection for accommodating multiple lower bandwidth signals (including some STS-N signals and some STS-Mc signals). The first is strictly a capacity limitation, i.e., the hardware at each intervening node must have sufficient available resources to process the totality of signals in the composite connection. This can easily be verified by comparing the total available capacity of a node to the required capacity of the composite connection. The total available capacity will, of course, be affected by existing traffic (e.g., other composite connections) currently being handled by the node.

The second limitation is more subtle and is one which is imposed by the specific hardware configuration of each node. For instance, the available hardware must be distributed in such a way that it is capable of processing the concatenated signals forming part of the composite high-capacity connection. Some distributions of hardware will permit the processing of signals in one category (e.g., STS-N) while not allowing the processing of signals in another category (e.g., STS-Nc). Moreover, the manner in which the available hardware resources are distributed depends largely on the way in which the presently occupied resources were allocated for processing the signals belonging to the other composite connections currently passing through the node in question.

To consider a simple example, if a node is equipped with 4 ASICs, each of which has just enough residual capacity to process three STS-1 signals, then processing of an STS-12c signal cannot take place at the node in question, even though the total available capacity is sufficient to process an STS-12c signal. This is due to the fact that the entire STS-12c signal must be processed by a single ASIC, none of which is available in this case. Thus, it would not be possible to establish a connection for carrying an STS-12c signal.

Because of this second limitation, a connection request for an STS-Mc signal across a network must be handled differently from a connection request for an STS-M signal or M STS-1 signals or M/3 STS-3 signals, for example. Also, a connection request for an individual signal connection must also be treated separately from a request involving a combination of concatenated and non-concatenated signals. Simply put, in order to establish a connection made up of a given combination of signals, knowledge of the specific hardware at each stage of the connection and knowledge of the actual set of signals to be transmitted is required.

Clearly, current methods of establishing connections are inefficient in their usage of hardware resources and thus it would be of benefit to provide an improved and more efficient way of establishing connections between end points in a network.

SUMMARY OF THE INVENTION

The present invention is directed to a method for efficiently establishing connections along a route in a communications network. The concept of a content-flexible (or "open") connection along the route is introduced. The establishment of an open connection corresponds to a reservation of appropriate hardware resources along the route. The manner in which the resources are allocated takes into consideration a maximum allowable capacity for the combination of signals to be carried by the open connection as well as a set of concatenation constraints which need to be satisfied by the combination of signals.

The resources are allocated in such a way as to allow the transport of any signal combination which satisfies the concatenation constraints and which has an aggregate capacity less than or equal to the maximum allowable capacity associated with the open connection. As a result, the signal make-up of the open connection can be changed as desired, without having to re-allocate the resources each time. Thus, the efficiency with which connections are established is improved by virtue of allowing a combination of signals transported as part of a pre-established connection to be changed at the end points of the route without having to reconfigure the hardware between the end points.

In addition, the invention offers advantages for the service provider and network operator, because these entities need not be concerned with resource allocation in response to unpredictable changes in the end user's desired traffic mix.

It is also within the scope of the invention to provide for the establishment of one or more content-flexible connections at a higher network layer within a single, lower-layer content-flexible connection or within a cascaded set of lower-layer content-flexible connections. From a network management perspective, this allows diverse service providers to establish inter-city connections through multiple service areas in an initial phase and then to change the traffic mix within each such inter-city connection to suit end user needs, with the knowledge that a new traffic mix can be supported if it meets the initially specified concatenation constraints.

According to one embodiment of the present invention, there is provided a method of establishing a content-flexible connection along a route in a network, where the method includes the steps of determining a capacity associated with the connection; determining a set of concatenation constraints associated with the connection; and allocating selected resources along the route to allow the delivery of any combination of signals satisfying the determined set of concatenation constraints and having a total capacity not exceeding the determined capacity.

In some embodiments, the concatenation constraints are satisfied by a particular combination of signals if the particular combination of signals only includes signals selected from a pre-determined group of signals. In other embodiments, the concatenation constraints are satisfied by a combination of signals if that combination only includes signals selected from a first pre-determined group of signals or sub-combinations of signals which satisfy a second set of concatenation constraints, where the second set of concatenation constraints is satisfied by a sub-combination of signals if that sub-combination only includes signals selected from a second pre-determined group of signals.

In either case, the signals which make up the transported combination of signals can include concatenated signals and/or non-concatenated signals.

According to a further embodiment, the step of allocating selected resources may include, for each node along the route, identifying an external connection pattern which is consistent with the route; identifying a distribution of node-level resources which allows the hardware requirements associated with the node to be met; and allocating the identified distribution of node-level resources.

Before the step of allocating selected resources, there may be provided the step of determining, from the determined capacity and the determined set of concatenation constraints, a set of hardware requirements associated with each node along the route.

Other embodiments of the invention provide methods, controllers and computer usable media with computer-readable program code for processing a request for an open connection received at a central control unit, at a controller in a node or at a controller in a sub-node-level component.

According to another embodiment of the invention, there is provided a method of establishing at least one higher layer connection within a lower layer connection in a network. The method includes determining a first capacity associated with the lower layer connection; determining a first set of concatenation constraints associated with the lower layer connection; establishing the lower layer connection by allocating selected resources along the route to allow the delivery of any combination of signals satisfying the first set of concatenation constraints and having a total capacity not exceeding the first capacity. Finally, in this embodiment, the method includes for each of the at least one higher layer connection, using a respective subset of the allocated resources to carry a respective combination of signals satisfying a respective set of second concatenation constraints which is a subset of the first set of concatenation constraints.

BRIEF DESCRIPTION OF THE DRAWINGS

These and other aspects and features of the present invention will now become apparent to those of ordinary skill in the art upon review of the accompanying description of specific embodiments of the invention in conjunction with the following drawings, in which.

DETAILED DESCRIPTION OF THE PREFERRED EMBODIMENTS

The present invention allows the establishment of content-flexible connections. A content-flexible connection can conveniently be referred to as an "open" connection, denoted OP-N, where N indicates that the total capacity of the open connection is equal to that of N STS-1 signals. While embodiments of the invention will be described herein below in the context of a SONET-based network, it should be understood that the invention is applicable in any synchronous digital environment, including SDH.

An OP-N connection is basically a bandwidth pipe that is routed once from end to end, and whose content can be changed at the end user's convenience. Thus, an OP-N connection is not a signal per se; instead, the establishment of an OP-N connection ensures that suitable resources have been allocated in order to support specific combinations of signals, some of which might be concatenated signals and others which might not.

It is important to note that an OP-N connection differs from a connection for an STS-N signal in that the resources (in the case of an OP-N connection) will usually have been allocated to handle one or more concatenated signals intended to be communicated through the open connection. On the other hand, an OP-N connection differs from a connection for an STS-Nc signal of the same capacity in that the contents of the OP-N connection need not consist of a single concatenated signal.

In order to establish an open connection, it is convenient in a first instance to specify it. An open connection can be specified by:

(a) its end points;

(b) its total capacity, defined for an OP-N connection as being N times the bandwidth of an STS-1 signal in the context of SONET; and (c) a set of concatenation constraints, for instance, the allowable combinations of concatenated and non-concatenated signals which are supported as part of the open connection.

Generally, concatenation constraints can be thought of as a requirement that the combination of signals intended for transport through an OP-N be restricted to a set of two or more distinct combinations of signals, possibly including signals with differing pointer structures.

By way of a specific example, it is possible to specify an OP-24 connection by requiring that the signals carried inside the OP-24 connection must (i) have a total capacity which does not exceed 24 times that of an STS-1 signal and (ii) obey concatenation constraints whereby they are limited to a combination of signals which only includes STS-1 signals, STS-3c signals, STS-12 signals and STS-12c signals.

Once an open connection (such as the just described example OP-24 connection) has been specified, it can be "established", which involves allocating appropriate switching and processing resources throughout the network. The process of resource allocation is now described in the context of an example.

Figure 1:
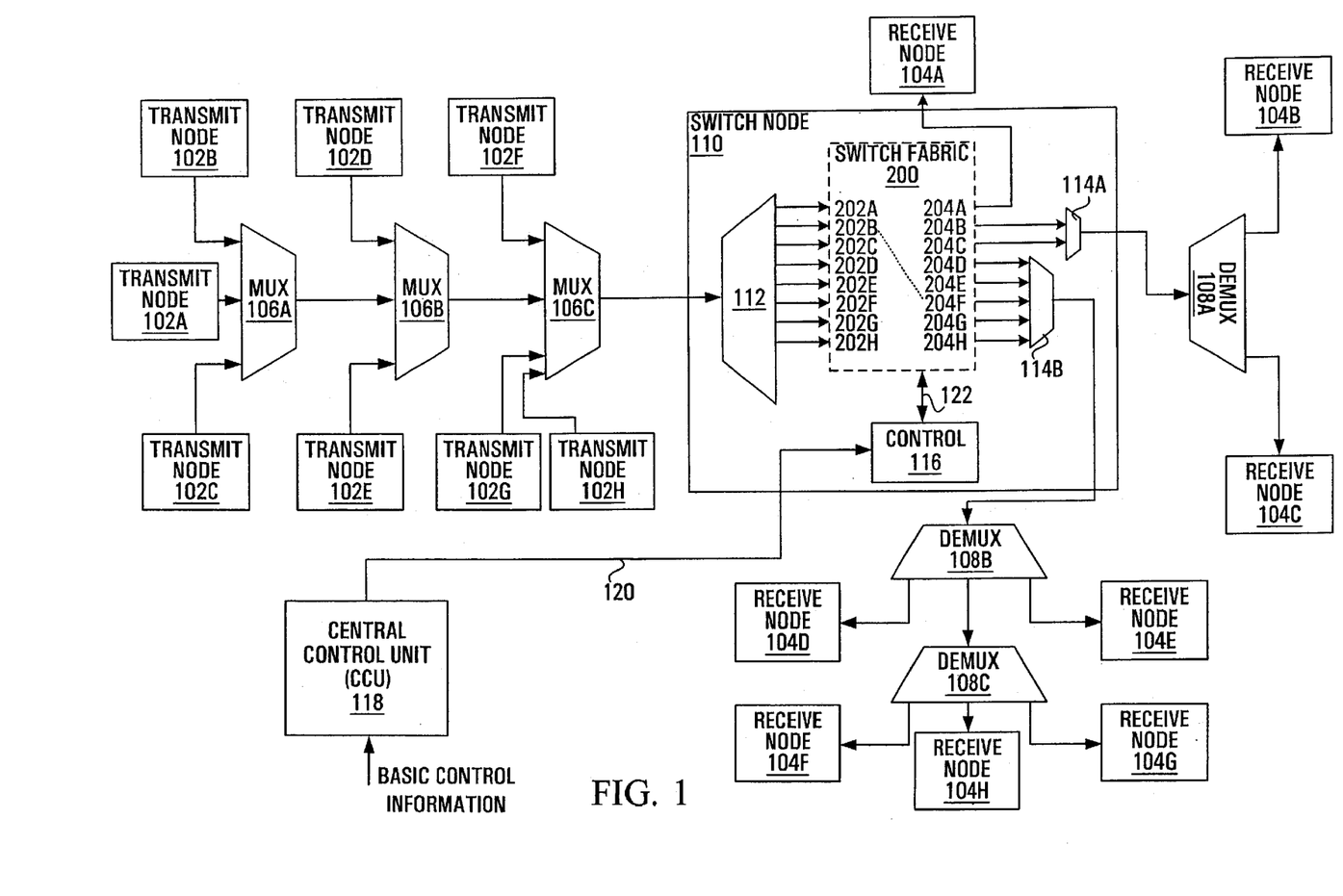
FIG. 1 shows a network comprising a switch node which is used to route unidirectional signals and which is responsive to a central control unit (CCU)

FIG. 1 shows part of a network adapted to carry SONET signals. The network of FIG. 1 is by no means limiting and is used solely for purposes of illustration to exemplify an architecture to which the present invention can be applied. The network of FIG. 1 comprises a plurality of transmit nodes 102A–102H which are connected to a plurality of receive nodes 104A–104H via an arrangement of muxes 106A–106C and demuxes 108A–108C and a switch node (or cross-connection hub) 110.

The digital traffic from transmit nodes 102A, 102B and 102C is combined into a single digital signal by suitable multiplexing circuitry, software or control logic at mux 106A. Similarly, the traffic from transmit nodes 102D and 102E and from mux 106A is combined into a single signal by suitable multiplexing circuitry, software or control logic at mux 106B. Also, the traffic from transmit nodes 102F, 102G and 102H is combined by suitable circuitry, software or control logic at mux 106C into a single signal delivered to the switch node 110.

Thus, a multiplexed digital signal arrives from mux 106C at the switch node 110. This multiplexed signal could be, for example, a signal having a capacity of 192 STS-1 signals which contains up to eight individual composite traffic streams from each of the eight transmit nodes 102A–102H destined for corresponding ones of the receive nodes 104A–104H. The role of the switch node 110 is to:

(a) route each of the composite signals present in the incoming multiplexed signal so that it is sent to the appropriate receive node; and (b) provide signal conditioning such as pointer processing and signal regeneration.

To this end, switch node 110 comprises a demux 112 at its input, a set of muxes 114A, 114B at its output, a switch fabric represented generally by 200 and a control unit (or controller) 116 connected to the switch fabric 200. The demux 112 is seen to have one input and a plurality of outputs which are respectively fed to a plurality of inputs 202A–202H of the switch fabric 200. The switch fabric 200 also has a plurality of outputs 204A–204H. In the architecture of FIG. 1, output 204A is connected directly to receive node 104A, outputs 204B and 204C are connected to receive nodes 104B and 104C via mux 114A and demux 108A and outputs 202D–202H are connected to receive nodes 104D and 104E via mux 114B and demux 108B and to receive nodes 104F–104H via mux 114B, demux 108B and demux 108C.

A central control unit (CCU) 118 located external to the switch node 110 is connected to the control unit 116 of the switch node 110 by a control link 120. The CCU 118 may be located at a network administration server, for example. It is assumed that the CCU 118 has knowledge of which transmitted signals (i.e., from transmit nodes 102A–102H) are mapped to which inputs (i.e., 202A–202H) of the switch fabric 200. It is also assumed that the CCU 118 has knowledge as to which of the outputs (i.e., 204A–204H) of the switch fabric 200 are mapped to which of the receive nodes 104A–104H.

The CCU 118 accepts basic control information from a network operator or service provider wishing to establish a desired open connection through the network. Examples of basic control information include the size and end points of the desired open connection. For instance, it may be desired to establish an OP-48 connection from transmit node 102B to receive node 104F through the switch node 110. The basic control information communicated to the CCU 118 in this case could be: "OP-48", "102B" and "104F".

As has been previously discussed, each open connection is associated with a set of concatenation constraints. This set of concatenation constraints is, in turn, associated with certain hardware requirements which must be met by each node along the route. The concatenation constraints associated with the desired open connection may be communicated to the CCU 118 as part of the above described basic control information. Alternatively, if they are derivable from the size of the open connection alone, the concatenation constraints can be looked up by arranging for the CU 118 to consult an internal database.

The CCU 118 comprises suitable circuitry, software, or control logic for determining the hardware requirements that must be met by each node along the route in order that any signal meeting the concatenation constraints can be carried from one end point to the other. An example of a hardware requirement is a restriction on the permitted level of splitting of SONET signals among different ASICs in a shelf located at a node.

The CCU 118 also comprises suitable circuitry, software or control logic for generating an "upper level model" and feeding the upper level model to the control unit 116 in the switch node 110 along the control link 120. Generation of an upper level model will be described in further detail later on but it is essentially based on the hardware requirements associated with the concatenation constraints of the desired open connection and on the transmit-node-to-input and output-to-receive-node mappings within the switch node 110.

In one embodiment, the up per level model generated by the CCU 118 will specify a connection pattern through the switch fabric 200 of the switch node 110 which would allow the desired open connection to be established if the internal structure of the switch fabric 200 were capable of satisfying the hardware requirements associated with the concatenation constraints of the desired open connection. By way of example, if the desired open connection were associated with end nodes 102B and 104F, then the connection pattern specified by the upper level model would match input 202A of the switch fabric 200 to output 204F, as shown by the dashed line 400 in FIG. 1.

The control unit 116 in the switch shelf 110 comprises suitable circuitry for receiving the upper level model from the CCU 118 along control link 120. The control unit 116 attempts to find a path through the switch fabric 200 which will satisfy the connection pattern indicated in the upper level model and which will satisfy the hardware requirements associated with the concatenation constraints of the desired open connection. The control unit 116 suggests one or more distinct paths through the switch fabric 200 in the form of a "lower level model".

To this end, the control unit 116 is equipped with circuitry, software or control logic for generating a lower level model which is fed to the switch fabric 200 along a control link 122. The control unit 116 is also responsive to messages received from the switch fabric 200 indicating whether the suggested path encapsulated in the lower level model has been accepted or rejected. The control unit 116 is further equipped with circuitry, control logic or software for reserving any resources which would be required at the node level in the event that a lower level model has been accepted by the switch fabric 200.

Figure 2:
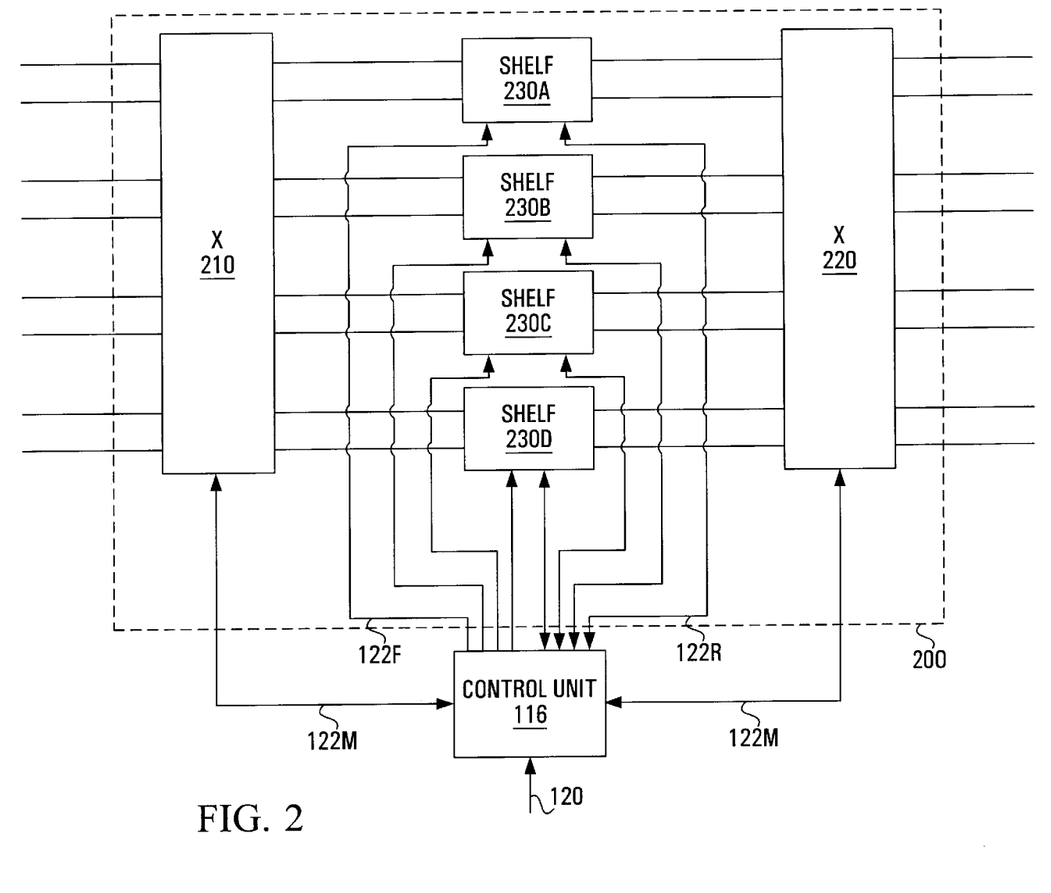
FIG. 2 shows in block diagram form one possible architecture of the switch node in FIG. 1, comprising a plurality of parallel shelves.

Internally, the switch fabric 200 may have one of many different architectural configurations. For example, as shown in FIG. 2, the switch fabric 200 may comprise an input cross-connect 210, an output cross-connect 220 and a parallel arrangement of shelves 230A–230D, each connected between two respective outputs of the input cross-connect 210 and two respective inputs of the output cross-connect 220. Each of the shelves 230A–230D is connected to the control unit 116 by a respective forward control link 122F and by a respective return control link 122R. Each of the cross-connects 210, 220 is supplied with a mapping from the control unit 116 along a respective one of a pair of control links 122M.

Figure 3:
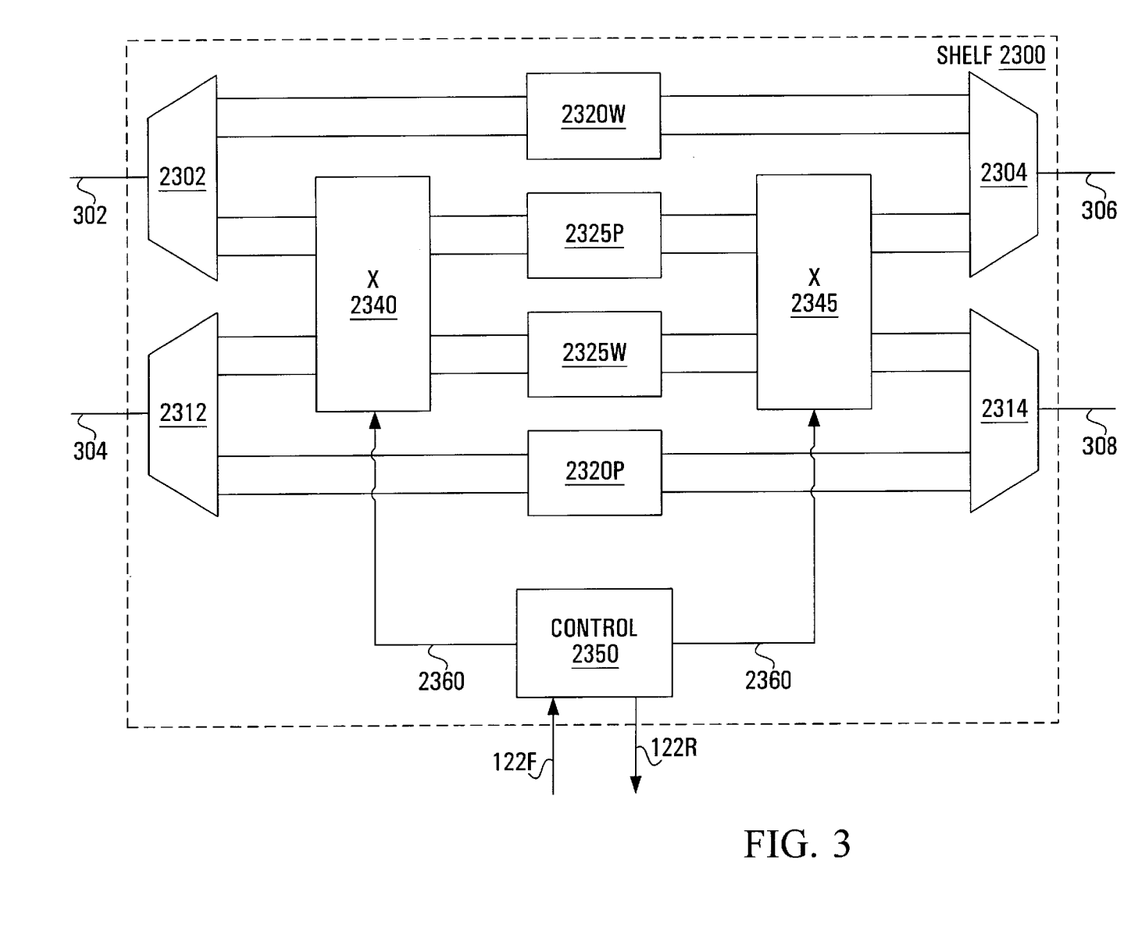
FIG. 3 shows in block diagram form one possible architecture of one of the shelves in FIG. 2.

Each of the shelves 230A–230D may have its own unique structure, a specific example of which is shown in FIG. 3 for a generic shelf 2300. This particular shelf 2300 has two four-way demuxes 2302, 2312 (one for each of the two incoming signals on respective inputs 302, 304) and two four-way muxes 2304, 2314 (one for each of the two outgoing signals on respective outputs 306, 308). A "weak" conditioning module 2320W is connected between two of the outputs of the demux 2302 and two of the inputs of the mux 2304. A "powerful" conditioning module 2320P is connected between two of the outputs of the other demux 2312 and two of the inputs of the other mux 2314.

(By way of a specific example, a "powerful" conditioning module could be circuitry, control logic or software which is capable of processing and regenerating an STS-12 signal or an STS-12c signal, whereas a "weak" conditioning module may be circuitry, control logic or software which is capable of processing and regenerating an STS-12 signal but would have insufficient resources to process and regenerate an STS-12c (i.e., concatenated) signal.)

The remaining two outputs of each of the demuxes 2302, 2312 are connected to an input side of a four-input, four-output cross-connect 2340 and the remaining two inputs of each of the muxes 2304, 2314 are connected to an output side of another four-input, four-output cross-connect 2345. A second weak conditioning module 2325W is connected between two of the outputs of the cross-connect 2340 and two of the inputs of the other cross-connect 2345, while a second powerful conditioning module 2325P is connected between the other two outputs of the cross-connect 2340 and the other two inputs of the other cross-connect 2345.

The shelf 2300 of FIG. 3 also comprises a control unit (or controller) 2350 connected to the cross-connects 2340, 2345 by control links 2360. The control unit 2350 comprises a memory for storing the connections currently being applied by the cross-connects 2340, 2345. The control unit 2350 also comprises a memory which stores the layout of the shelf, including details about accessibility of the weak and powerful conditioning modules from the perspective of the demuxes 2302, 2312. The control unit 2350 further comprises circuitry, software or control logic for controlling the operation of the cross-connects 2340, 2345.

Thus, a variety of routes are available through the shelf 2300 of FIG. 3, as controlled through control signals provided by the control unit 2350 to the cross-connects 2340, 2345 along control links 2360.

The reference to "weak" and "powerful" conditioning modules and the specific architecture of FIG. 3 has been used so as to illustrate the fact that the composition of a shelf may be asymmetric and that the level of processing available within a shelf can depend on the route taken though the shelf. For example, it is noted that in the specific shelf architecture of FIG. 3, absolute flexibility is not possible, as the "top" two signals exiting the demux 2302 are restricted to pass through the weak conditioning module 2320W, whereas the "bottom" two signals of the demux 2312 are forced to pass through the powerful conditioning module 2320P.

This fact is significant in considering which hardware requirements can and cannot be met when the control unit 2350 is asked to respond to a suggested connection (received in the form of a "lower level model") from the node-level control unit 116. The control unit 2350 is thus also equipped with circuitry, software or control logic for receiving a lower level model along control link 122F, evaluating whether the suggested connection can be accommodated, responding to the control unit 116 along control link 122R in the form of a message which indicates "suggestion accepted" or "suggestion rejected", and reserving resources at the shelf level in the event that the suggested connection can be met.

Operation of the CCU 118, the control unit 116 and the control unit 2350 is now described in more detail with reference to FIGS. 4, 5 and 6, respectively, with application to the example network of FIG. 1.

Figure 4:
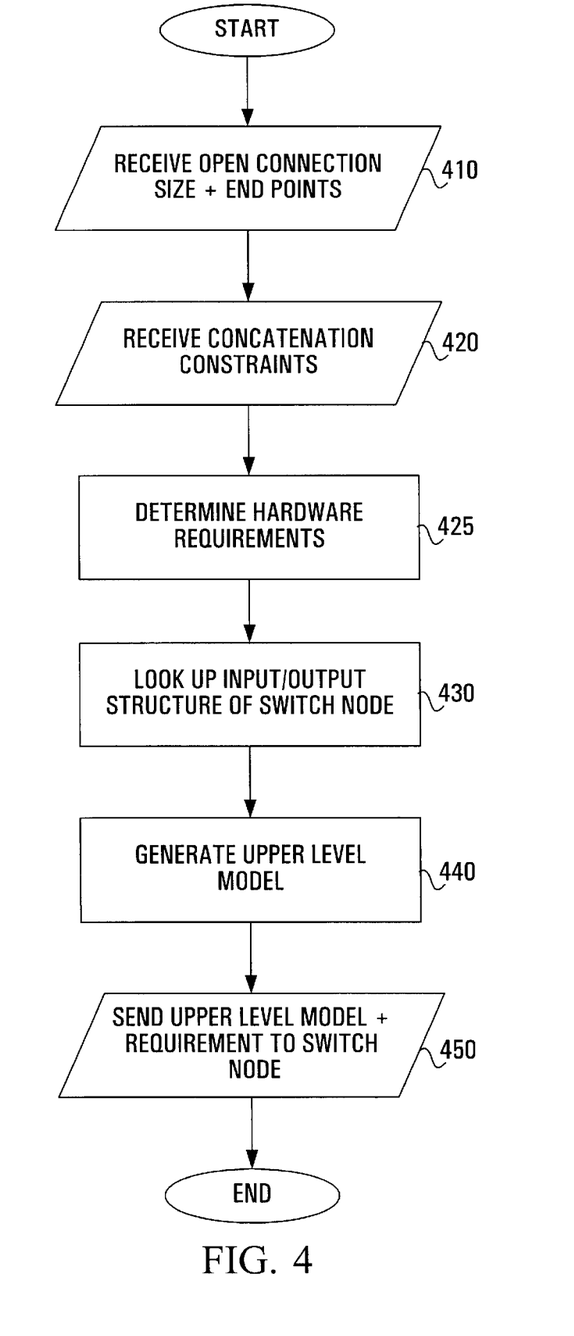
FIG. 4 is a flowchart illustrating operation of the CCU in FIG. 1 according to an embodiment of the present invention.
Figure 5:
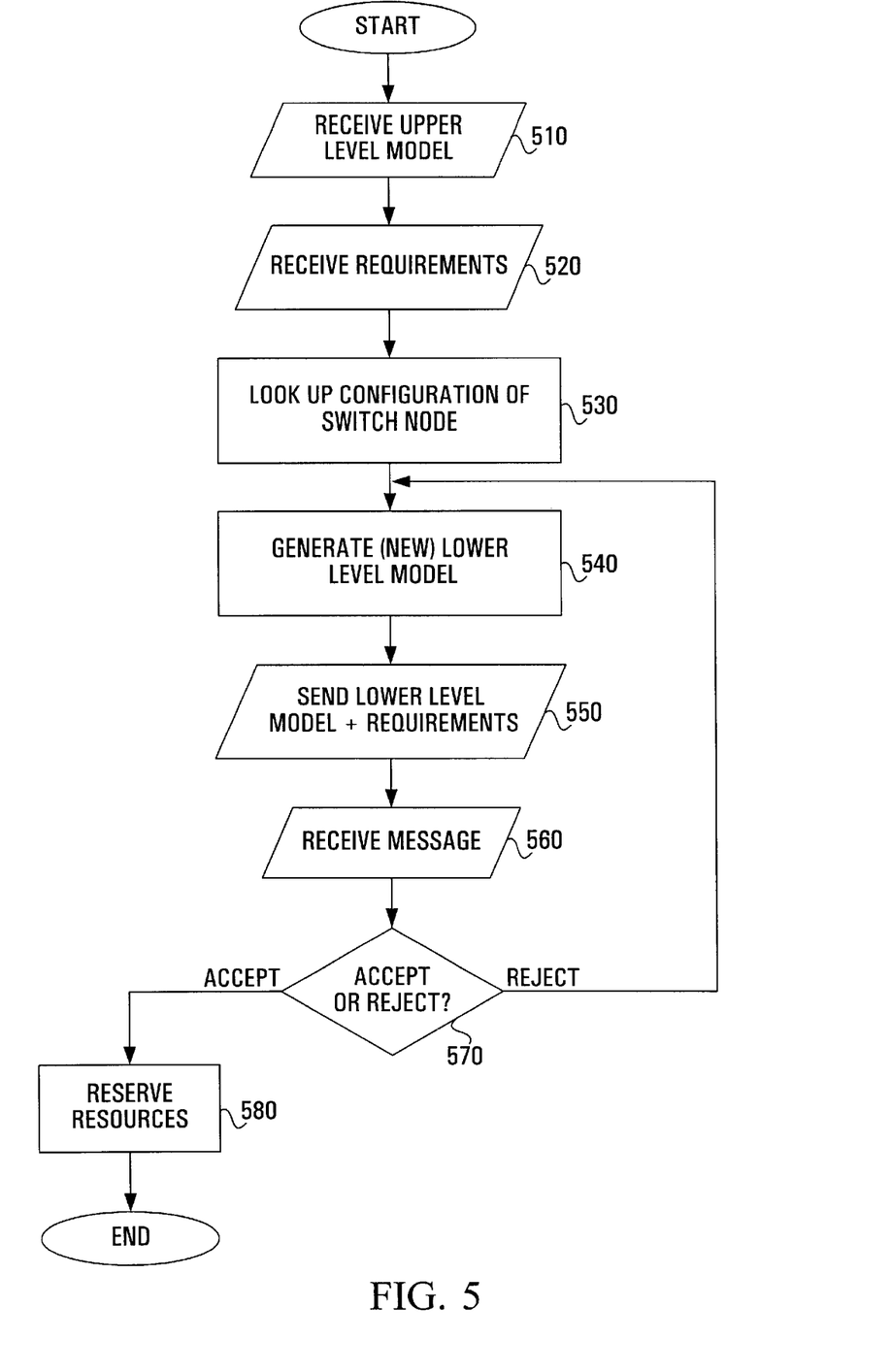
FIG. 5 is a flowchart illustrating operation of a node-level controller according to an embodiment of the present invention.

Firstly, with reference to FIG. 4, at step 410, the CCU 118 receives the specification of the desired open connection, including the size and end points of the desired open connection. At step 420, the CCU 118 receives concatenation constraints associated with the desired open connection. It is also within the scope of the invention for the CCU 118 to look up these concatenation constraints if they can be inferred from the size of the desired open connection.

At step 425, the CCU 118 determines the hardware requirements to be met at each node so that signals meeting the concatenation constraints will be properly routed form one end point to the other along the desired route.

At step 430, the CCU 118 looks up the transmit-node-to-input and output-to-receive-node mappings in respect of the switch fabric 200 in switch node 110. Then, at step 440, the CCU 118 finds an external connection of the switch fabric 200 which will allow the desired open connection to be established between the two specified end points. This external connection is known as the "upper level model" associated with the desired open connection. At step 450, the CCU 118 sends the upper level model to the control unit 116 in the switch node 110 along control link 120.

Thus, for example, if the transmit node were identified as node 102B and if the receive node were identified as node 104F, then the CCU 118 could send an upper level model to the control unit 116, the desired external connection between the inputs and outputs of the switch fabric 200 being shown by the dotted line in FIG. 1.

Operation of the control unit 116 within switch shelf 110 is now described with reference to FIG. 5, where step 510 first indicates that the control unit 116 receives the upper level model (indicating an external connection pattern) from the CCU 118. At step 520, the control unit 116 receives the hardware requirements associated with the concatenations constraints of the desired open connection which have somehow to be satisfied by the switch fabric 200. (These hardware requirements could be provided by the CCU 118 along control link 120.)

In order to determine whether the switch fabric 200 can satisfy the hardware requirements associated with the concatenation constraints of the desired open connection, the control unit 116 determines the architectural configuration of the switch fabric (at step 530) and generates a "lower level model" (at step 540). The lower level model takes into account the external connection pattern indicated by the upper level model and also the architectural configuration of the switch fabric 200 and the hardware requirements associated with the concatenation constraints of the desired open connection.

If the switch fabric 200 has the architecture shown in FIG. 2, then the lower level model will contain a suggested internal connection through one or more selected shelves 230A–230D. The lower level model will also contain shelf-level hardware requirements derived from the original node-level hardware requirements. At step 550, the lower level model is provided in message form to the selected shelves along the appropriate forward control links 122F.

In some cases, for example if a particular shelf contains enough residual capacity to allow the desired open connection to be established therethrough, the lower level model may include a suggested connection through that particular shelf alone. In other cases, the lower level model may specify that the participation of two or more shelves is required in the end-to-end establishment of the desired open connection.

As will be described later on with reference to FIG. 6, the selected shelf (or shelves) processes the lower level model and returns a response ("suggestion accepted" or "suggestion rejected") in message form along the appropriate return control link 122R. At step 560, the control unit 116 receives the response message from the selected shelf (or shelves) and at step 570, the response message is checked to see whether it is an acceptance or a rejection.

If the suggested connection has been rejected, then the algorithm of the control unit 116 returns to step 540, where the control unit 116 generates a new lower level model, different from the previous one, containing a new suggested connection through one or more shelves (but containing the same shelf-level hardware requirements derived form the original node-level hardware requirements.) The above-described process continues until the response message indicates an acceptance at step 570. When a suggested connection is eventually accepted, the control unit 116 will, at step 580, reserve the appropriate node-level resources which permit the suggested connection to be established through the selected shelf or shelves.

Figure 6:
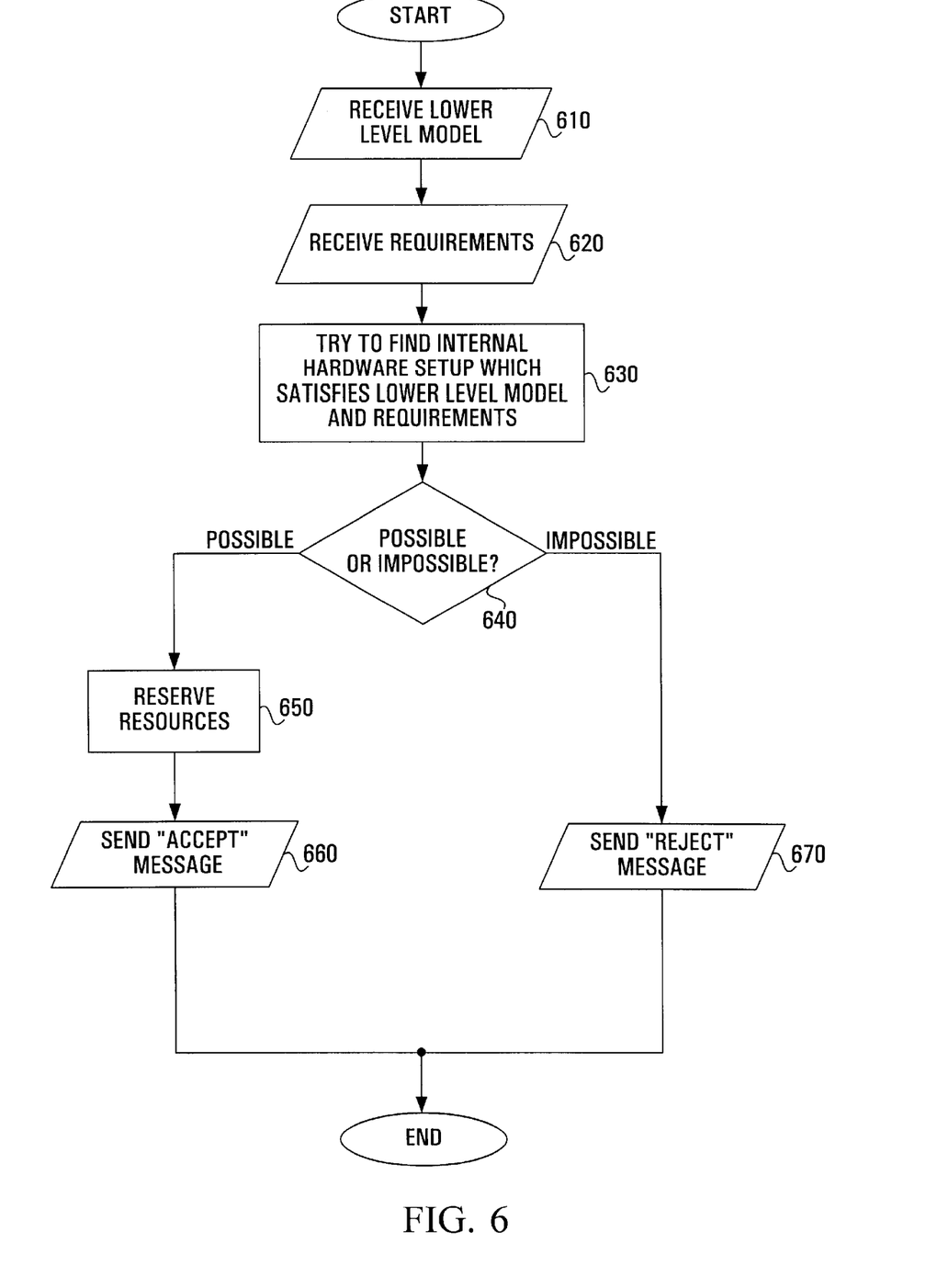
FIG. 6 is a flowchart illustrating operation of a shelf-level controller according to an embodiment of the present invention.

With reference now to FIG. 6, there is shown a flowchart illustrating operation of the control unit inside a given shelf, e.g., control unit 2350 in the shelf 2300 of FIG. 3. At step 610, the control unit 2350 receives the lower level model containing a suggested connection through the shelf 2300.

At step 620, the control unit 2350 receives or otherwise obtains knowledge of the shelf-level hardware requirements associated with the desired open connection. Of course, if the lower level model contains these shelf-level hardware requirements, then step 620 is implicit in step 610. At step 630, the control unit 2350 attempts to find an allocation of its own available resources which would allow the suggested connection to be established and the specified shelf-level hardware requirements to be satisfied.

At step 640, the control unit 2350 determines whether it is capable of allocating its available resources so that the suggested connection is established and the shelf-level hardware requirements are satisfied. This can be verified by the control unit 2350 consulting the shelf layout and other data stored in its memory. If it determines that it is capable of doing so, then the control unit 2350 proceeds to reserve the shelf-level resources required for establishing the suggested connection (at step 650) and returns an "accept" message to the node-level control unit 116 along return control link 122R.

However, if no allocation of the available resources of the chosen shelf 2300 allows the suggested connection to be established and the shelf-level hardware requirements to be satisfied, the control unit 2350 returns a "reject" message to the control unit 116, indicating that the suggested connection will not allow the shelf-level hardware requirements associated with this particular desired open connection to be satisfied.

By way of example, let the suggested connection (contained in the lower level model) be a connection through the shelf 2300 of FIG. 3, specifically from input 302 to output 308, and let the shelf-level hardware requirements in this case include the ability to process arbitrary combinations of STS-1 signals, STS-3c signals, STS-12 signals and STS-12c signals having an aggregate bandwidth of not more than 24 times that of an STS-1 signal. (It is noted that in complex cases, different shelves may have different hardware requirements, depending on the node architecture and the overall concatenation constraints of the desired open connection.)

Also, let the "powerful" conditioning modules 2320P and 2325P be the only ones capable of processing STS-12c signals (i.e., the "weak" conditioning modules are not capable of providing the necessary processing power). Then it is clear that the hardware requirements cannot be met, because both powerful conditioning modules 2320P, 325P need to be accessed but it is impossible to reach powerful processing module 2320P from demux 2302 (i.e., from input 302).

The shelf-level control unit 2350 would thus send a "reject" message to the control unit 116 located at the node level, which control unit 116 would then suggest a different connection through the shelf 2300. If this new suggested connection involves routing input 304 to output 308, then the hardware requirements can be met because both powerful processing modules 2320P, 2325P are accessible from input 304. Hence, the control unit 2350 proceeds with shelf-level resource allocation.

In particular, shelf-level resource allocation may involve directing the cross-connect 2340 to switch its two inputs from demux 2312 over to the powerful conditioning module 2325P. Similarly, control unit 2350 should instruct cross-connect 2345 to route its two inputs from the powerful conditioning module 2345 over to mux 2314. Subsequently, the shelf-level control unit 2350 sends an "accept" message to the node-level control unit 116 along its respective return control link 112R.

It is also within the scope of the invention for the node-level control unit 116 to report an eventual acceptance of a suggested connection by a shelf or shelves back to the CCU 118 (via control link 120). The CCU 118 would then conclude that the desired open connection has been successfully established and may report this fact to the service provider.

Also, there may be many options for establishing the open connection through the switch node 110, in which case a first upper level model could be generated and sent by the CCU 118 to the node-level control unit 116 and if this upper level model is rejected, another upper level model could be generated, and so on, in a similar manner to the generation and acceptance or rejection of lower level models described herein above.

It is noted that the concatenation constraints associated with an OP-N connection may be broad enough to allow for the establishment of OP-X connections within the OP-N connection, where X<N. For instance, it is possible to specify an OP-24 connection as having the usual capacity limit, (i.e., the signals carried inside the OP-24 connection must have a capacity not exceeding 24 times that of an STS-1 signal) and also having concatenation constraints which specify that the signals carried inside the OP-24 connection must consist of a combination of signals including only:

(a) STS-1 signals;
(b) STS-3c signals; and
(c) signals satisfying the concatenation constraints associated with an OP-12 connection.

Thus, in order to determine the full set of concatenation constraints in the above example of an OP-24 connection, it is necessary to consider the concatenation constraints associated with an OP-12 connection.

Figure 7:
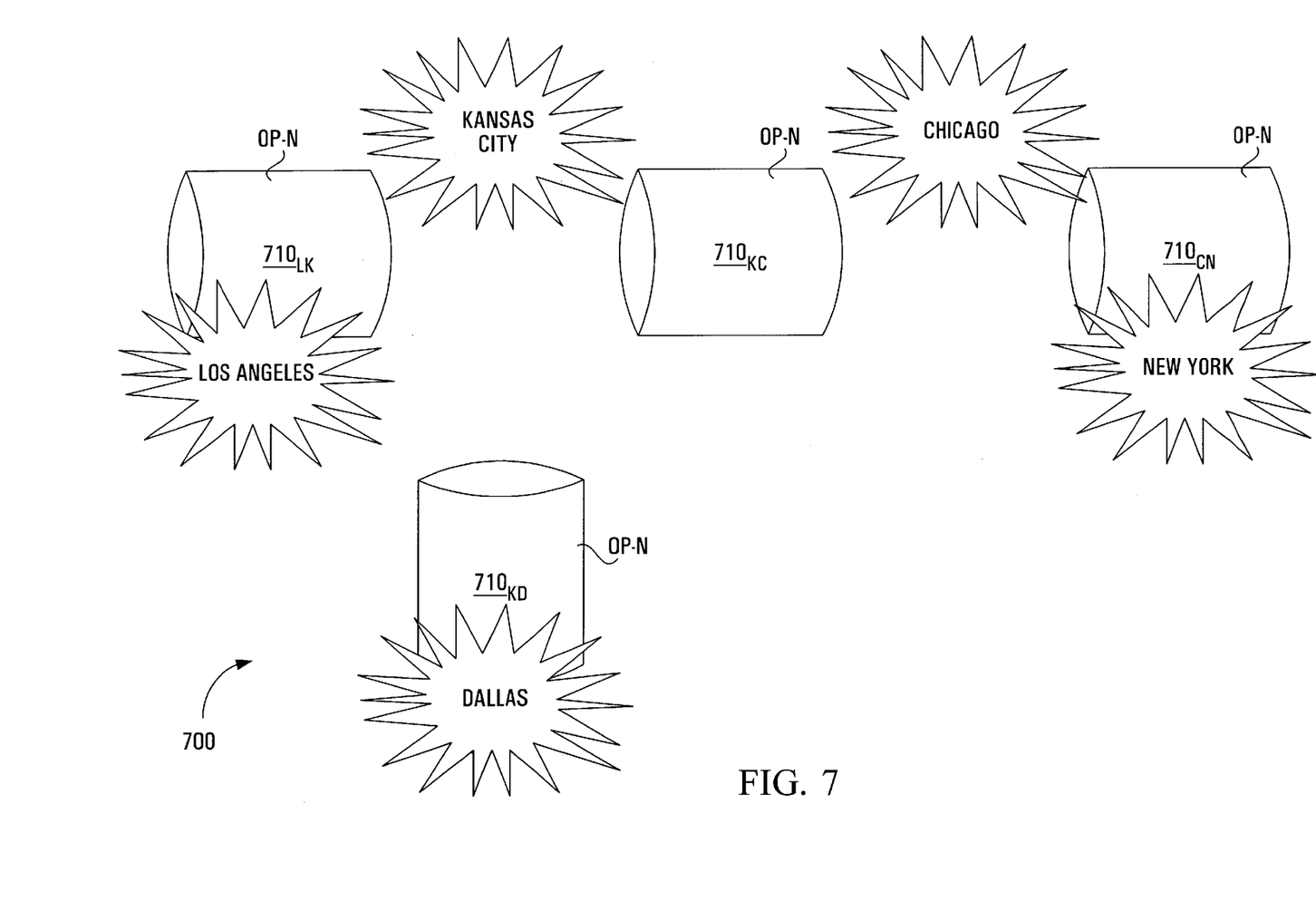
FIG. 7 shows large open connections established between adjacent pairs of major cities.

The ability to establish smaller OP-X connections within a larger OP-N connection provides a significant benefit in the management of a large network. For example, FIG. 7 shows a large network which could be a trans-continental network, for example. The transcontinental network shown at 700 consists of an arrangement of pipes $710_{LK}$, $710_{KD}$, $710_{KC}$, $710_{CN}$ that connect neighbouring pairs of large cities (Los Angeles to Kansas City, Kansas City to Dallas, Kansas City to Chicago, Chicago to New York, respectively). The pipes $710_{LK}$, $710_{KD}$, $710_{KC}$, $710_{CN}$ may be managed by different network operators (also known as network administrators or telcos) depending on the geographic area where each pipe is located.

Each of the pipes $710_{LK}$, $710_{KD}$, $710_{KC}$, $710_{CN}$ represents a high-capacity bi-directional open connection (e.g., an OP-N connection) which can have uni-directional components that are established in each direction according to the method described herein above. In establishing a particular pipe, the responsible network operator ensures that the hardware along (and at either end of) the particular pipe is suitably allocated so that the hardware requirements associated with the concatenation constraints of the OP-N connection are satisfied. Thus, the pipes $710_{LK}$, $710_{KD}$, $710_{KC}$, $710_{CN}$ will be mapped onto the topology of the underlying network infrastructure, may span more than one wavelength within a single fiber, may extend through one or more cross-connection hubs and may pass through one or more shelves/ASICs at a cross-connection hub.

It should be appreciated that the pipes $710_{LK}$, $710_{KD}$, $710_{KC}$, $710_{CN}$ may be quasi-static in that they may stay in place for a typical period of months or years. Also, the OP-N connections can be protected by protection switching in standard topologies such as ring or 1+1 to achieve the desired level of connection availability. Furthermore, all the open connections need not be of the same total capacity, e.g., some may be OP-N1 connections, some may be OP-N2 connections, etc.

To achieve maximum flexibility and benefit, the concatenation constraints associated with each OP-N connection should allow for the possibility of carrying signals that satisfy the concatenation constraints of smaller open connections (e.g., OP-X connections, X<N) within each pipe. In other words, for maximum flexibility and benefit, the concatenation constraints associated with an OP-N provided by each of the pipes $710_{LK}$, $710_{KD}$, $710_{KC}$, $710_{CN}$ should allow for the establishment of combinations of OP-X connections.

Because it involves the allocation of hardware resources, the establishment of the pipes $710_{LK}$, $710_{KD}$, $710_{KC}$, $710_{CN}$ in FIG. 7 can be said to occur at a "low" layer of the network management hierarchy. At a somewhat higher layer of the network management hierarchy, it may be of interest for the network operators to cooperate and establish a connection between each possible pair of large cities represented in FIG. 7 and not just between neighbouring pairs of large cities.

As long as the desired inter-city connection is composed of a combination of signals which satisfy the concatenation constraints associated with each intervening OP-N connection (pipe), it will be possible to establish the desired connection by simply providing appropriate routing at each large city along the way without concern for the intervening hardware resources. Therefore, in the above example, if the desired connection is an OP-X connection between every pair of large cities shown in FIG. 7, it will be possible for the different network operators involved to establish these OP-X connections without concern for the particular hardware resources owned by the different network operators. This is because concatenation freedom is already ensured by having established the large OP-N connections (pipes $710_{LK}$, $710_{KD}$, $710_{KC}$, $710_{CN}$).

Figure 8:
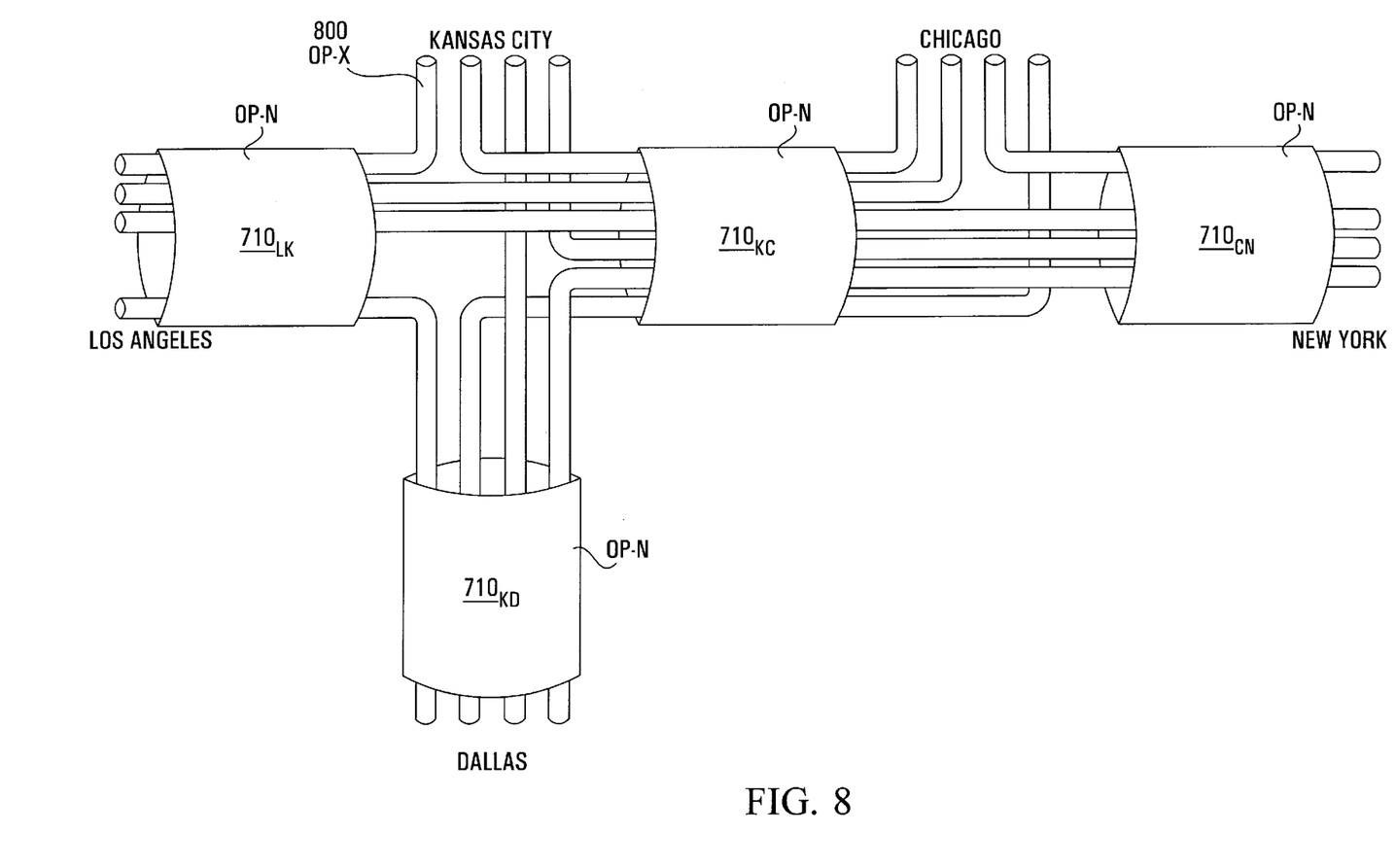
FIG. 8 shows smaller open connections established between pairs of major cities, through the large open connections of FIG. 7.

FIG. 8 shows the result of having established an OP-X connection 800 between each pair of large cities in FIG. 7. Since the OP-X connections themselves are content-flexible, changes in the traffic mix of a particular OP-X connection (say, the one between New York and Los Angeles) are permitted and do not require any hardware re-allocation or other intervention from the part of each network operator along the way.

In fact, the above described layering of open connections can be extended to the next highest layer, which involves the establishment of smaller connections within a particular OP-X connection. This situation may arise when one or more competing service providers in one city (e.g., Los Angeles) are desirous of establishing connections with one or more service providers in another city (e.g., Dallas).

As long as the desired connections are composed of combinations of signals which satisfy the concatenation constraints associated with an OP-X connection, it will be possible to establish the desired connections without concern for any intervening hardware resources. If the desired connections are smaller (e.g., OP-Y connections, Y<X), then it is necessary to ensure that the concatenation constraints associated with an OP-X connection permit the establishment of combinations of OP-Y connections.

An advantage of permitting the establishment of OP-Y connections within an OP-X connection that has already been established between two cities by cooperation of the network operators is that the content of each OP-Y connection can be changed by the end users (from the point of view of each service provider) without interacting with any network operator as regards suitable allocation of hardware resources and so on. Again, this is because concatenation freedom is already ensured by the larger city-to-city OP-X connection.

It will be appreciated by those skilled in the art that the above described layering technique can be continued ad nauseam, until an arbitrarily high layer of the network management hierarchy has been reached. In some cases, the layering technique may end with the establishment of an open connection between an end customer (or "consolidator") which leases an end-to-end open connection from a service provider and which can change the traffic mix of that open connection without having to notify the supplier of the lower layers of the network (i.e., service provider and network operators).

Advantageously, the network can thus be managed independently at each layer. When the traffic demand from the layer above is predicted to require more than the available capacity between a given source and destination, the open connection can be enlarged or additional open connections may be routed at that layer of the network hierarchy. Conversely, when it is feasible to reduce the capacity of an open connection between given points at a particular layer, the unused resources can be re-allocated towards increasing the capacity of other connections at that layer.

While the preferred embodiment of the present invention has been described and illustrated, it will be apparent to those skilled in the art that numerous modifications and variations can be made without departing from the scope of the invention as defined in the appended claims.

I claim:

1. A method of establishing a connection along a route in a network, comprising:

determining a capacity associated with the connection;

determining a set of concatenation constraints associated with the connection; and allocating selected resources along the route to allow the delivery of any combination of signals satisfying the determined set of concatenation constraints and having a total capacity not exceeding the determined capacity.

2. A method as claimed in claim 1, wherein the concatenation constraints are satisfied by a particular combination of signals if the particular combination of signals only includes signals selected from a pre-determined group of signals.

3. A method as claimed in claim 2, wherein the pre-determined group of signals includes at least one concatenated signal.

4. A method as claimed in claim 2, wherein the pre-determined group of signals includes at least one non-concatenated signal.

5. A method as claimed in claim 2, wherein the pre-determined group of signals includes at least one concatenated signal and at least one non-concatenated signal.

6. A method as claimed in claim 5, wherein the at least one concatenated signal includes an STS-Mc signal for an integer M and wherein the at least one non-concatenated signal includes an STS-N signal for an integer N.

7. A method as claimed in claim 2, wherein said route traverses at least one node in the network and wherein the method further comprises, before the step of allocating selected resources:

determining, from the determined capacity and the determined set of concatenation constraints, a set of hardware requirements associated with each node along the route.

8. A method as claimed in claim 7, wherein the step of allocating selected resources comprises, for each node along the route:

(1) identifying an external connection pattern which is consistent with the route;

(2) identifying a distribution of node-level resources which allows the hardware requirements associated with the node to be met; and (3) allocating the distribution of node-level resources identified at step (2).

9. A method as claimed in claim 8, wherein step (2) comprises:

(a) identifying an internal connection pattern through the node which is consistent with the external connection pattern, said internal connection pattern being associated with a distribution of node-level resources;

(b) determining if the hardware requirements associated with the node can be met by applying the identified internal connection pattern; and (c) if so, proceeding to step (3) using the distribution of node-level resources associated with the identified internal connection pattern; otherwise (i) identifying another internal connection pattern through the node which is consistent with the external connection pattern and which is associated with another distribution of node-level resources; and (ii) repeating steps (b) and (c).

10. A method as claimed in claim 9, wherein said node-level resources include switching and processing resources.

11. A method as claimed in claim 9, wherein each node comprises a plurality of interconnected shelves and wherein step (b) comprises, for each shelf:

(B1) identifying a shelf-level connection pattern which is consistent with the internal connection pattern, said shelf-level connection pattern being associated with a respective distribution of shelf-level resources;

(B2) determining, from the hardware requirements associated with the node, a set of hardware requirements associated with the shelf;

(B3) determining if the hardware requirements associated with the shelf can be met by applying the identified shelf-level connection pattern; and (B4) if so, allocating the distribution of shelf-level resources associated with the identified shelf-level connection pattern and proceeding to step (c); otherwise (i) identifying another shelf-level connection pattern through the node which is consistent with the internal connection pattern and which is associated with another distribution of shelf-level resources; and (ii) repeating steps (B3) and (B4).

12. A method as claimed in claim 11, further comprising:

(B5) if no shelf-level connection pattern is capable of meeting the hardware requirements associated with the shelf, signaling this fact at the node level.

13. A method as claimed in claim 1, wherein the concatenation constraints are satisfied by a combination of signals if that combination only includes:

signals selected from a first pre-determined group of signals; or sub-combinations of signals which satisfy a second set of concatenation constraints;

wherein said second set of concatenation constraints is satisfied by a sub-combination of signals if that sub-combination only includes signals selected from a second pre-determined group of signals.

14. A method as claimed in claim 13, wherein the first pre-determined group of signals includes at least one concatenated signal.

15. A method as claimed in claim 13, wherein the first pre-determined group of signals includes at least one non-concatenated signal.

16. A method as claimed in claim 13, wherein the first pre-determined group of signals includes at least one concatenated signal and at least one non-concatenated signal.

17. A method as claimed in claim 16, wherein the at least one concatenated signal includes an STS-Mc signal for an integer M and wherein the at least one non-concatenated signal includes an STS-N signal for an integer N.

18. A method as claimed in claim 13, wherein the second pre-determined group of signals includes at least one concatenated signal.

19. A method as claimed in claim 13, wherein the second pre-determined group of signals includes at least one non-concatenated signal.

20. A method as claimed in claim 13, wherein the second pre-determined group of signals includes at least one concatenated signal and at least one non-concatenated signal.

21. A method as claimed in claim 20, wherein the at least one concatenated signal includes an STS-Mc signal for an integer M and wherein the at least one non-concatenated signal includes an STS-N signal for an integer N.

22. A method as claimed in claim 13, wherein said route traverses at least one node in the network and wherein the method further comprises, before the step of allocating selected resources:

determining, from the determined capacity and the first set of concatenation constraints, a set of hardware requirements associated with each node along the route.

23. A method as claimed in claim 22, wherein the step of allocating selected resources comprises, at each node along the route:

(1) identifying an external connection pattern which is consistent with the route;

(2) identifying a distribution of node-level resources which allows the hardware requirements associated with the node to be met; and (3) allocating the distribution of node-level resources identified at step (2).

24. A method as claimed in claim 23, wherein step (2) comprises:

(a) identifying an internal connection pattern through the node which is consistent with the external connection pattern, said internal connection pattern being associated with a distribution of node-level resources;

(b) determining if the hardware requirements associated with the node can be met by applying the identified internal connection pattern; and (c) if so, proceeding to step (3) using the distribution of node-level resources associated with the identified internal connection pattern; otherwise (i) identifying another internal connection pattern through the node which is consistent with the external connection pattern and which is associated with another distribution of node-level resources; and (ii) repeating steps (b) and (c).

25. A method as claimed in claim 24, wherein said node-level resources include switching and processing resources.

26. A method as claimed in claim 24, wherein each node comprises a plurality of interconnected shelves and wherein step (b) comprises:

(B1) identifying a shelf-level connection pattern which is consistent with the internal connection pattern, said shelf-level connection pattern being associated with a respective distribution of shelf-level resources;

(B2) determining, from the hardware requirements associated with the node, a set of hardware requirements associated with the shelf;

(B3) determining if the hardware requirements associated with the shelf can be met by applying the identified shelf-level connection pattern; and (B4) if so, allocating the distribution of shelf-level resources associated with the identified shelf-level connection pattern and proceeding to step (c); otherwise
  (i) identifying another shelf-level connection pattern through the node which is consistent with the internal connection pattern and which is associated with another distribution of shelf-level resources; and
  (ii) repeating steps (B3) and (B4).

27. A method as claimed in claim 26, further comprising:

(B5) if no shelf-level connection pattern is capable of meeting the hardware requirements, signaling this fact at the node level.

28. A method as claimed in claim 1, further comprising:
transmitting a combination of signals along the route, wherein the transmitted combination of signals satisfies said set of concatenation constraints.

29. A method as claimed in claim 28, wherein each of the signals in the transmitted combination of signals is a frame-based signal.

30. A method as claimed in claim 28, further comprising:
at the end points of the route, altering the composition of the transmitted combination of signals, wherein the altered transmitted combination of signals still satisfies the set of concatenation constraints.

31. A method of processing a request for establishing a connection along a route in a network, wherein said route traverses at least one node, said request being indicative of a capacity and a set of concatenation constraints associated with the connection, the method comprising:
  determining, from the capacity and from the set of concatenation constraints, a set of hardware requirements associated with each node;
  for each node along the route, identifying an external connection pattern which is consistent with the route; and
  sending to each node the external connection pattern and the set of hardware requirements associated therewith.

32. A method of processing, at a node, a request for establishing a connection through the node, said request being indicative of an external connection pattern and a set of hardware requirements associated with the node, the method comprising:
  (a) identifying an internal connection pattern involving sub-node-level components which is consistent with the external connection pattern, said internal connection pattern being associated with a distribution of node-level resources;
  (b) sending the hardware requirements associated with the node and the internal connection pattern to the sub-node-level components;
  (c) determining whether the hardware requirements associated with the node can be met by applying the identified internal connection pattern; and
  (d) if so, allocating the distribution of node-level resources associated with the identified internal connection pattern; otherwise
    (i) identifying another internal connection pattern which is consistent with the external connection pattern and which is associated with another distribution of node-level resources; and
    (ii) repeating steps (b), (c) and (d).

33. A method of processing, at a sub-node-level component, a request for establishing a connection through the component, said request being indicative of an internal connection pattern and a set of hardware requirements associated with the component, the method comprising:
  (a) identifying a sub-node-level connection pattern which is consistent with the internal connection pattern, said sub-node-level connection pattern being associated with a respective distribution of sub-node-level-level resources;
  (b) determining if the hardware requirements associated with the component can be met by applying the identified sub-node-level connection pattern; and
  (c) if so, allocating the distribution of sub-node-level resources associated with the identified sub-node-level connection pattern; otherwise
    (i) identifying another sub-node-level connection pattern through the node which is consistent with the internal connection pattern and which is associated with another distribution of sub-node-level resources; and
    (ii) repeating steps (b) and (c).

34. An article of manufacture, comprising:
a computer usable medium having computer readable program code means embodied therein for causing a controller to process a request for establishing a connection along a route in a network, wherein said route traverses at least one node, said request being indicative of a capacity and a set of concatenation constraints associated with the connection, the computer readable program code means in said article of manufacture comprising:
  computer readable program code means for causing a computer to determine, from the capacity and from the set of concatenation constraints, a set of hardware requirements associated with each node;
  computer readable program code means for causing a computer to identify, for each node along the route, an external connection pattern which is consistent with the route; and
  computer readable program code means for causing a computer to send to each node the external connection pattern and the set of hardware requirements associated therewith.

35. An article of manufacture, comprising:
a computer usable medium having computer readable program code means embodied therein for causing a node controller to process a request for establishing a connection through the node, said request being indicative of an external connection pattern and a set of hardware requirements associated with the node, the computer readable program code means in said article of manufacture comprising:
  computer readable program code means for causing a computer to identify an internal connection pattern involving sub-node-level components which is consistent with the external connection pattern, said internal connection pattern being associated with a distribution of node-level resources; and
  computer readable program code means for causing a computer to:
    (a) send the hardware requirements associated with the node and the internal connection pattern to the sub-node-level components to determine whether the hardware requirements associated with the node can be met by applying the identified internal connection pattern; and (b) if so, to allocate the distribution of node-level resources associated with the identified internal connection pattern; otherwise to identify another internal connection pattern which is consistent with the external connection pattern and which is associated with another distribution of node-level resources and to repeat steps (a) and (b).

36. An article of manufacture, comprising:
a computer usable medium having computer readable program code means embodied therein for causing a sub-node-level controller to process a request for establishing a connection through the component, said request being indicative of an internal connection pattern and a set of hardware requirements associated with the component, the computer readable program code means in said article of manufacture comprising:
computer readable program code means for causing a computer to identify a sub-node-level connection pattern which is consistent with the internal connection pattern, said sub-node-level connection pattern being associated with a respective distribution of sub-node-level-level resources; and
computer readable program code means for causing a computer to:
  (a) determine if the hardware requirements associated with the component can be met by applying the identified sub-node-level connection pattern; and
  (b) if so, to allocate the distribution of sub-node-level resources associated with the identified sub-node-level connection pattern; otherwise to identify another sub-node-level connection pattern through the node which is consistent with the internal connection pattern and which is associated with another distribution of sub-node-level resources and to repeat steps (a) and (b).

37. A controller for processing a request for establishing a connection along a route in a network, wherein said route traverses at least one node, said request being indicative of a capacity and a set of concatenation constraints associated with the connection, comprising:
means for determining, from the capacity and from the set of concatenation constraints, a set of hardware requirements associated with each node;
means for identifying, for each node along the route, an external connection pattern which is consistent with the route; and
means for sending to each node the external connection pattern and the set of hardware requirements associated therewith.

38. A node controller for processing a request for establishing a connection through the node, said request being indicative of an external connection pattern and a set of hardware requirements associated with the node, comprising:
means for identifying an internal connection pattern involving sub-node-level components which is consistent with the external connection pattern, said internal connection pattern being associated with a distribution of node-level resources; and
means for:
  (a) sending the hardware requirements associated with the node and the internal connection pattern to the sub-node-level components to determine whether the hardware requirements associated with the node can be met by applying the identified internal connection pattern; and
  (b) if so, allocating the distribution of node-level resources associated with the identified internal connection pattern; otherwise identifying another internal connection pattern which is consistent with the external connection pattern and which is associated with another distribution of node-level resources; and repeating steps (a) and (b).

39. A sub-node-level controller for processing a request for establishing a connection through the component, said request being indicative of an internal connection pattern and a set of hardware requirements associated with the component, comprising:
means for identifying a sub-node-level connection pattern which is consistent with the internal connection pattern, said sub-node-level connection pattern being associated with a respective distribution of sub-node-level resources; and
means for:
  (a) determining if the hardware requirements associated with the component can be met by applying the identified sub-node-level connection pattern; and
  (b) if so, allocating the distribution of sub-node-level resources associated with the identified subnode-level connection pattern; otherwise identifying another sub-node-level connection pattern through the node which is consistent with the internal connection pattern and which is associated with another distribution of sub-node-level resources; and repeating steps (a) and (b).

40. A method of establishing at least one higher layer connection within a lower layer connection in a network, comprising:
determining a first capacity associated with the lower layer connection;
determining a first set of concatenation constraints associated with the lower layer connection;
establishing the lower layer connection by allocating selected resources along the route to allow the delivery of any combination of signals satisfying the first set of concatenation constraints and having a total capacity not exceeding the first capacity; and
for each of the at least one higher layer connection, using a respective subset of the allocated resources to carry a respective combination of signals satisfying a respective set of second concatenation constraints which is a subset of the first set of concatenation constraints.

41. A method as claimed in claim 40, wherein the combination of signals associated with each higher layer connection has a total capacity not exceeding the first capacity.

42. A method as claimed in claim 40, wherein the lower layer connection is associated with a first route having end points and wherein each higher layer connection is associated with a respective second route having respective end points, wherein at least one second route is longer than the first route.

43. A method as claimed in claim 40, wherein the method further comprises:
at the end points of the second route, altering the respective composition of the transmitted combination of signals, wherein the altered transmitted combination of signals still satisfies the respective second set of concatenation constraints.

* * * * *